Inventor.
G. W. Markle

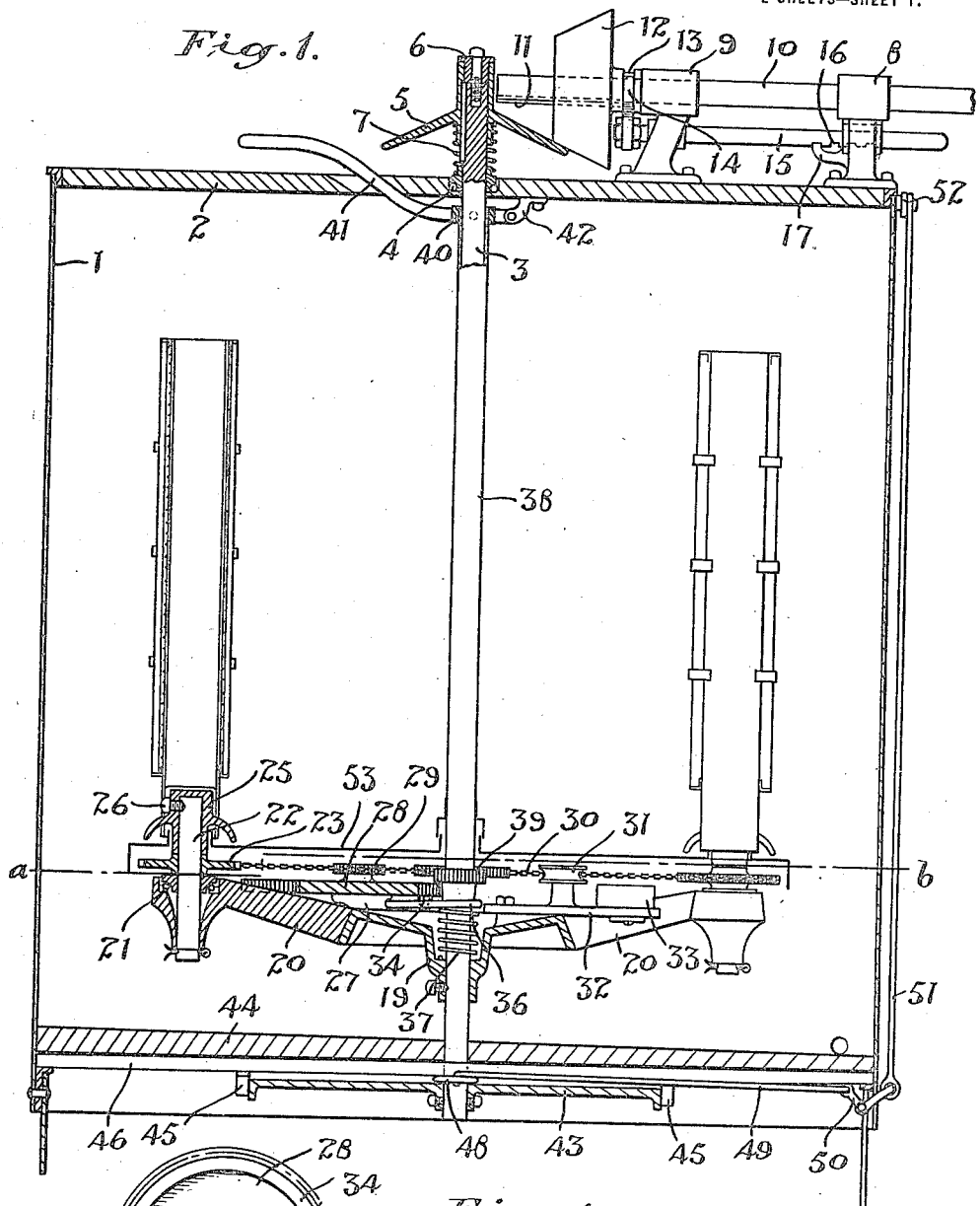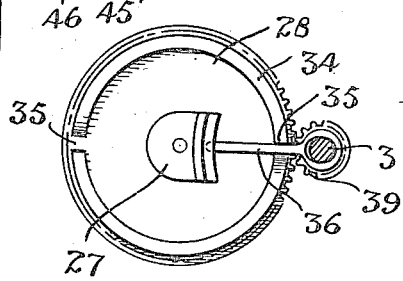

UNITED STATES PATENT OFFICE.

GEORGE WALLACE MARKLE, OF BRANTFORD, ONTARIO, CANADA.

HONEY-EXTRACTOR.

1,277,451.                    Specification of Letters Patent.           Patented Sept. 3, 1918.

Application filed September 4, 1917.  Serial No. 189,437.

*To all whom it may concern:*

Be it known that I, GEORGE W. MARKLE, a subject of the King of Great Britain, and resident of the city of Brantford, county of Brant, Province of Ontario, in the Dominion of Canada, have invented certain new and useful Improvements in Honey-Extractors, described in the following specification and illustrated in the accompanying drawings, that form part of the same.

The principal objects of the invention are to effect the separation of the honey from the combs in a simple, efficient and economical manner and to device a construction of centrifugal separator in which the comb holding baskets may be reversed without stopping or slowing down the machine and without jarring and injuring the comb.

A further object is to produce a machine of simple, strong and durable construction and in which the speed of operation may be regulated to suit requirements without interfering with the driving medium.

The principal feature of the invention consists in the novel construction and arrangement of parts, whereby the comb holding baskets are individually and rotatably supported upon a rotatable member and are adapted to be held in a fixed position in relation to the main rotating member or they may be revolved in unison on their individual axes during the rotation of the main member by bringing a rotatable member operatively connected with the basket holding members into operative engagement with a non-rotatable member and whereby the speed of rotation is controlled by a sliding friction cone pulley operating in contact with a cone disk spring supported on the shaft of the main rotating member.

In the accompanying drawings Figure 1 is an elevational view partly in longitudinal mid-section, of my extractor.

Fig. 4 is an underside plan detail of the operating gear for controlling the rotation of the basket holding members.

Figure 2:
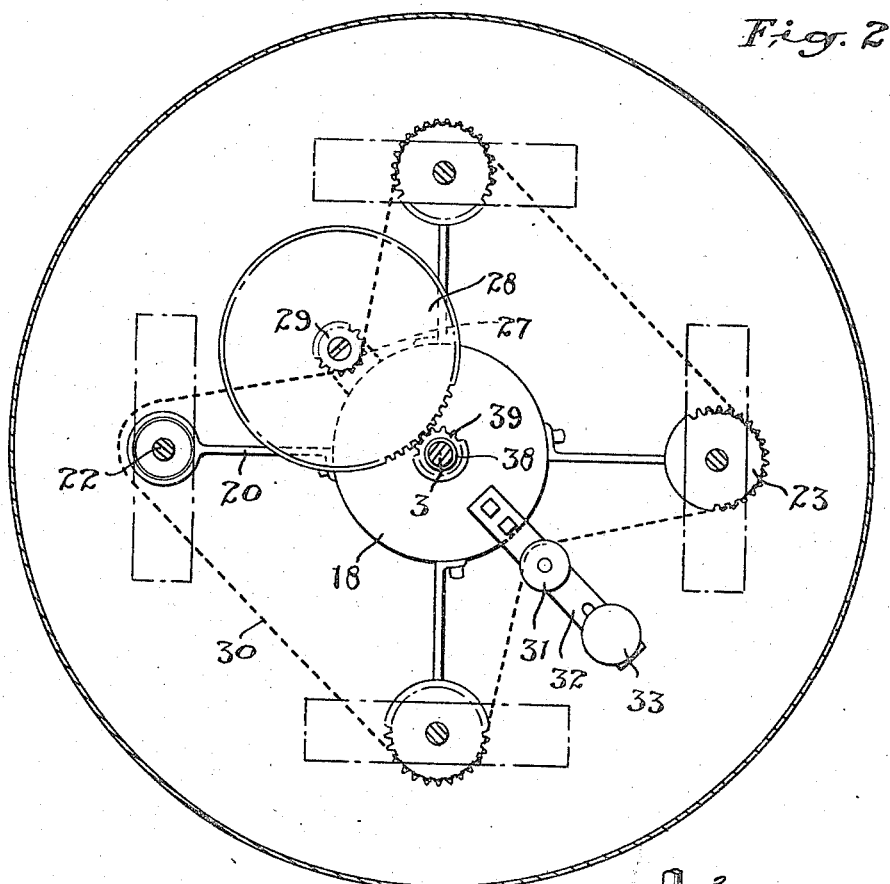
Fig. 2 is a horizontal sectional view through the line *a—b* of Fig. 1.
Figure 3:
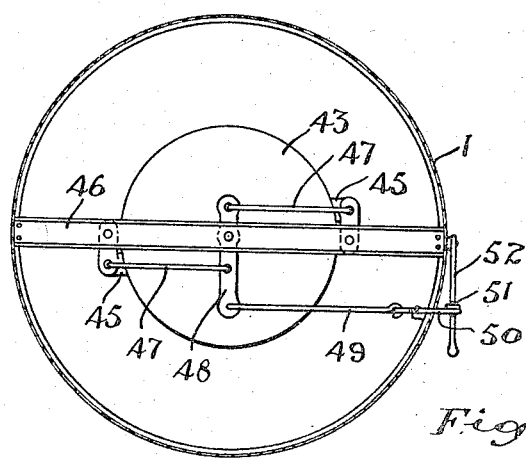
Fig. 3 is a diagrammatic plan view on a reduced scale, showing the braking mechanism.
Figure 5:
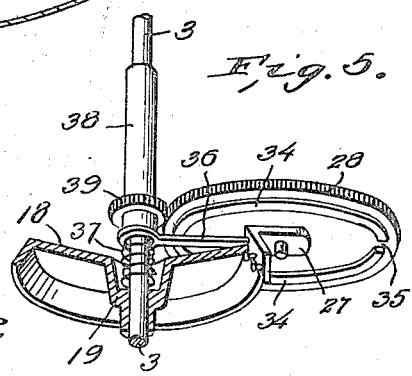
Figure 5 is a perspective part sectional detail of the gear for controlling the rotation of the basket-holding members.

In the use of centrifugal honey extractors it is necessary to alter the position of the comb so that the honey contained at each side of the central division wall in the comb will be extracted by centrifugal action.

Many different structures have been devised to change the position of the comb holder but the objectionable feature of a jar or shock to the comb caused by the shifting during the operation of the machine necessitates the stopping or slowing down of the machine if the comb would be preserved. Some forms of machines swing the baskets by one side and reverse them by pivoting upon the supports. The shock in such forms of machines, unless they were brought to rest, causes the destruction of the comb structure.

Other machines support the baskets centrally and revolve it a half turn by crank mechanisms, but such structures also impart considerable shock both in the starting and stopping of the turning of the basket.

According to the present invention these difficulties have been overcome.

In reference to the accompanying drawings, the structure consists of an outer cylindrical casing, 1, which is of the usual form having the top cross bar 2 supporting the vertical shaft 3 on the ball bearing 4. The shaft 3 carries at the upper end a cone disk 5 which is slidably keyed thereon and held from displacement by the cap 6 secured to the end of the shaft. A spiral spring 7 encircling the shaft supports the disk in a raised position.

Horizontally arranged journal bearings 8 and 9 support a horizontally and radially arranged shaft 10, the inner end thereof extending close to the hub of the disk 5. The shaft 10 is connected to any suitable form of driving medium and at its inner end is provided with a longitudinal key 11. 12 is a cone pulley slidably mounted on the keyed end of the shaft 10, having an annular groove 13 formed in the hub into which a forked member 14 secured upon a rod 15 extends. The rod 15 is slidably mounted in the supports for the journals 8 and 9 and is adapted to be held in adjusted positions being here shown formed with notches 16 in the underside adapted to engage a lug 17 on the bracket of the journal 8.

The cone pulley engages the cone disk and according to its position upon the shaft 10 the speed of rotation of the cone disk 5 and shaft 3 varies, the said cone disk being held in adjustable contact with the pulley by means of the spring 7.

A circular shaped member 18 is secured to the shaft 3 adjacent to its lower end having a hollow central boss 19. Secured to the periphery of the member 18 are a plurality of arms 20 which extend radially outward therefrom and at their outer ends are provided with vertically arranged ball bearings 21 in which the vertical spindles 22 are mounted. Sprocket wheels 23 are mounted on the spindles 22 above the ball bearings and the comb baskets are formed with socket shaped bottom portions 25 which fit over the upper ends of the spindles 22 and are secured thereon by the set screws 26.

A bracket 27 is rigidly secured to the periphery of the member 18 midway between two of the arms 20 and forms the bearing support for the spindle of a spur gear 28 and said gear 28 is formed with a sprocket 29 which is arranged in horizontal alinement with the sprocket wheels 23. An endless sprocket chain 30 extends around the outer side of the sprocket wheels 23 and upon the inner side of the sprocket 29 carried on the spur gear 28. The adjustment of this chain is effected by a tightener in the form of a pulley 31 adjustably secured upon an arm 32 arranged diametrically opposite to the bracket 27.

The outer end of the arm 32 is slotted and adjustably secured thereon is a counter balance weight 33.

The entire structure connected to the member 18 is carried upon the vertical shaft 3 and rotates therewith within the casing 1 and the baskets are held in the operating positions for throwing the honey outwardly from one side of the combs as shown in dotted lines in Fig. 2 by means of the sprocket chain.

The spur gear 28 is formed with a downwardly projecting flange 34 on the underside, which flange is provided with one or more notches 35.

An arm 36 is formed with a slotted end which loosely encircles the shaft 3 and its outer end is pivotally held in a notched recess in the bracket 27. The arm 36 is adapted to enter the notches 35 in the flange 34 of the spur gear 28 and is held in contact with said flange by a coil spring 37 arranged in the hollow boss 19 of the member 18. Said arm locks the spur gear 28 from rotation upon its axis but does not interfere with the rotary movement of the entire member supported on the shaft.

A sleeve 38 slidably encircles the shaft 3 and at its lower end is secured a spur pinion 39 the teeth of which are adapted to mesh with the teeth of the spur gear 28. The hub of the pinion 39 rests upon the slotted arm 36 and the teeth of the pinion are held in a raised position out of mesh with the spur gear 28 by means of the coil spring 37. The upper end of the sleeve 38 is provided with a collar 40 and pivotally connected to this collar is a hand lever 41 which projects upwardly beyond the cross bar 2. The inner end of the lever 41 is pivotally secured to a bracket 42 secured to the cross bar 2 so that upon the depression of the outer end of the lever 41 the sleeve 38 will be pushed downwardly to bring the pinion 39 into mesh with the gear 28. The lever 41 holds the sleeve and consequently the pinion 39 from rotation and when the pinion is brought into mesh with the spur gear 28, the said gear being carried in a circumferential orbit around the shaft 3 is caused to rotate upon its individual axis through engagement with the pinion thereby operating the sprocket chain and consequently through the sprocket wheels 23 turning the spindles 22 upon their axes.

As the comb baskets are secured to the spindles 22 the said baskets will be rotated with the spindles. The gear 28 continues to rotate upon its axis to swing the baskets until the slotted arm 36 enters one of the notches 35 in the flange 34 and as the arm enters the said notch it lifts the sleeve and pinion clear of the gear 28 and coincidently stops and locks the gear.

The ratio of the various gears and sprockets is such as to effect a half revolution of the comb baskets when the operation is automatically discontinued and the opposite sides of the combs are turned outwardly. The action of rotation of the comb baskets in the manner described is extremely simple and on account of the gear ratio involved and the manner of bringing the gears into mesh, the movement is very gentle and it will be readily seen that the stationary pinion may be slipped into engagement with the spur gear without appreciable shock irrespective of the speed of operation of the main shaft and that it will not be necessary to either stop the rotation of the main shaft or appreciably reduce its speed in order to effect the rotation of the baskets.

If it is found desirable to only partially empty the walls on one side of the combs and then turn the combs around, this can be done and the action again repeated as many times as desirable as the operation is always in the same direction and no reversal of the mechanism is required.

A construction such as described is extremely rigid, the parts are simple and cheap to construct and an extremely efficient device is produced.

In order to effect the stopping of the rotatable separator member, I provide a brake drum 43 upon the lower end of the shaft below the bottom 44 of the casing and a pair of brake shoes 45 are pivotally connected to the cross bar 46. These shoes are connected by the links 47 to a centrally arranged lever 48 and this lever is operated by a rod 49 connected to a bell crank 50 pivotally supported at one side of the casing. This bell crank is operated by a rod 51 which is connected to a suitable lever 52 at the top of the machine.

The mechanism within the separator is protected by a circular sheet metal guard 53 so that it will not come in contact with the honey.

It will be noted that the comb holding baskets are secured upon the spindles 22 by the set screws 26 and that by loosening said set screws the basket may be immediately removed in its entirety from the separator. This feature greatly facilitates the cleansing of the separator as the baskets may be removed and washed separately and as there are no obstructions whatever within the casing, it is a very simple matter to wash off the sides, bottom and cover 53 protecting the operating mechanism.

What I claim as my invention is:—

1. In a honey extractor, the combination with the main casing and a centrally arranged rotatable shaft, of a member secured to said shaft and rotating therewith, a plurality of basket holding spindles rotatably supported on said member, an endless belt operatively connecting said spindles, a rotatable member operating said endless belt, a stationary member adapted to be brought into temporary engagement with said rotatable member to effect the rotation of the endless belt and said baskets, and means for automatically disconnecting said rotating means.

2. In a honey extractor, the combination with the main casing and a centrally arranged rotatable shaft, of a member secured to said shaft and rotating therewith, a plurality of basket holding spindles rotatably supported on said member, an endless belt operatively connecting said spindles, a rotatable member operating said endless belt, a stationary member adapted to be brought into temporary engagement with said rotatable member to effect the rotation of the endless belt and said basket spindles, spring means adapted to move said stationary member upwardly to disengage from said rotating member, and means for holding said stationary member in operative contact with said rotating member for a definite period.

3. In a honey extractor, the combination with the main casing and a centrally arranged rotatable shaft, of a member secured to the shaft and rotating therewith, a plurality of basket holding spindles individually rotatably supported upon said member, a flexible belt operatively connecting said spindles, a spur gear wheel journaled in the member secured to said shaft, a sprocket carried by said spur gear and operatively engaging said belt, a spur pinion encircling said shaft and non-rotatably supported and adapted to engage said spur gear, means for operating said spur pinion to move it into mesh with said spur gear, and means for automatically disengaging said pinion and gear.

4. In a honey extractor, the combination with the main casing and a centrally arranged rotatable shaft, of a member secured to said shaft, a plurality of spindles rotatably mounted in said member and carrying comb-holding baskets, sprocket wheels secured to said spindles, a sprocket chain extending around said sprocket wheels, an idler sprocket engaging said sprocket chain, a spur gear secured to said idler sprocket, a sleeve encircling said shaft, a spur pinion secured to said sleeve adapted to be moved into mesh with said spur gear, means for rigidly holding said sleeve from rotation a spring member adapted to raise said spur pinion from engagement with said spur gear, an arm arranged between said pinion and spring, and a cam arranged upon said spur gear adapted to release said arm to allow said spring to disengage said gears.

5. In a honey extractor, the combination with the main casing and a centrally arranged rotatable shaft, of a member rigidly connected to said shaft, a plurality of comb-holding baskets individually and rotatably supported upon said rotatable member, means operatively connecting said members to rotate them in unison, a spur gear mounted on said rotatable member and operatively connected with said basket holding members, a sleeve encircling said shaft and having a spur pinion secured thereon adapted to mesh with said spur gear, a lever pivotally secured to the upper end of said sleeve and holding said sleeve from rotation and adapted to move the same downwardly to cause said pinion to mesh with said gear, and automatic means for disengaging said pinion from said gear.

6. In a honey extractor, the combination with the main casing and a centrally arranged rotatable shaft, of a member secured to said shaft and rotating therewith, spindles rotatably supported on said member, comb holding baskets rotatively mounted centrally of their width upon said spindles and non-rotatively secured thereto, a rotatable member operatively connected with said spindles and carried upon the member secured to the central shaft, and a non-rotatable member supported on said shaft adapted to be brought into operative engagement with said rotatable member to effect a semi-rotation of the said spindles and the baskets carried thereon in unison.

GEORGE WALLACE MARKLE.

Copies of this patent may be obtained for five cents each, by addressing the "Commissioner of Patents, Washington, D. C."